US006564921B1

(12) United States Patent
Gorczyca

(10) Patent No.: US 6,564,921 B1
(45) Date of Patent: May 20, 2003

(54) DIRECTION OF TRAVEL INDICATOR FOR ESCALATORS AND MOVING WALKWAYS

(76) Inventor: Chad Gorczyca, 3000 Country Pl., Rockwall, TX (US) 75087

( * ) Notice: Subject to any disclaimer, the term of this patent is extended or adjusted under 35 U.S.C. 154(b) by 0 days.

(21) Appl. No.: 10/014,770

(22) Filed: Dec. 11, 2001

(51) Int. Cl.[7] ................................................ B65G 15/00
(52) U.S. Cl. ....................................... 198/324; 198/337
(58) Field of Search ................................ 198/321, 324, 198/335, 337, 502.1

(56) References Cited

U.S. PATENT DOCUMENTS

| | | | | |
|---|---|---|---|---|
| 4,798,274 A | 1/1989 | Saito | | 198/324 |
| 5,020,256 A | 6/1991 | French | | 40/661 |
| 5,040,659 A | 8/1991 | Saito et al. | | 198/324 |
| 5,160,009 A | 11/1992 | Iyoda et al. | | 198/337 |
| 5,275,270 A | 1/1994 | Dobó | | 198/337 |
| 5,431,271 A | 7/1995 | Abraham et al. | | 198/324 |
| 6,047,809 A | 4/2000 | Idetsuki | | 198/337 |

FOREIGN PATENT DOCUMENTS

| | | | | |
|---|---|---|---|---|
| JP | 52-39274 | * | 3/1977 | 198/324 |
| JP | 2-127390 | * | 5/1990 | 198/324 |
| JP | 3-138297 | * | 6/1991 | 198/324 |

* cited by examiner

*Primary Examiner*—James R. Bidwell
(74) *Attorney, Agent, or Firm*—Cox & Smith Incorporated

(57) ABSTRACT

A directional indicator for automated transport devices, such as escalators and moving walkways, for permitting the discernment of the direction of travel of the transport device from a distance. The directional indicator comprises a set of indicia permanently formed or placed on the moving handrail of the escalator or moving walkway that can be seen and easily discerned from a distance. The indicia are preferably of a bright color that strongly contrasts with the dark gray or black of the typical escalator or moving walkway handrail construction. The indicia are also sized, configured, and spaced along the handrail to allow the viewer from a distance to quickly and easily interpret the motion thereof. The indicia are constructed of a material that is placed on or incorporated into the material of the handrail in such a manner as to prevent its removal from the handrail and to prevent the degradation of the contrasting visual effect over time.

14 Claims, 2 Drawing Sheets

DIRECTION OF TRAVEL INDICATOR FOR ESCALATORS AND MOVING WALKWAYS

BACKGROUND OF THE INVENTION

1. Field of the Invention

The present invention relates generally to escalators and other mechanisms for the automated transport of people between vertically or horizontally displaced positions. The present invention relates more specifically to indicia, visible from a distance, for indicating the direction of travel of an escalator, moving walkway, or other automated transport mechanism.

2. Description of the Related Art

One of the most common mechanisms for moving people between floor levels in a building is an escalator. One of the most common mechanisms for moving people across long distances within a single floor of a building is a moving walkway. Such automated transport mechanisms are well known and are particularly common in large open public areas such as airport terminals and shopping malls. Escalators and moving walkways are frequently used in such environments because of their ability to safely and quickly move large numbers of people between levels or floors or across a single floor within the public space.

Escalators and moving walkways function well because they are fully automated and require little or no control from the passengers utilizing them for transport. A passenger simply steps onto the first "step" of the moving stairway or walkway and is automatically propelled up, down, or across according to the direction that the escalator or walkway is traveling. Part of their efficiency lies in the fact that escalators and moving walkways are continuously running in a specific direction (up or down) or across and do not require (or permit) the selection of a direction of travel by the user. Passengers must instead select or locate an escalator or moving walkway that is traveling in the direction that they wish to travel. This is contrasted with an elevator (for example) wherein the passenger is free to access any elevator and then choose the direction of travel upon selecting a specific floor destination. Of course a major disadvantage of an elevator in the environment described above is its ability to carry only a limited number of passengers at a time and then only in one direction at a time. Passengers or potential passengers may have to wait a period of time before the elevator begins to move in the direction they wish to travel. An escalator or moving walkway, on the other hand, is always moving the direction of travel that the passengers desire. That is as long as the passengers have identified and have accessed an escalator or walkway moving in the desired direction.

One of the drawbacks of current escalator and moving walkway designs is the limited ability to discern from a distance the direction of travel that a specific device is moving. This would not be much of a problem if escalators were always positioned in pairs, one moving up and the second moving down, but in fact this is seldom the case. It is not uncommon for a potential escalator passenger to view an escalator from a distance across a large open public area and perceive it to be moving in a desired direction, only to arrive at the escalator and find that they were mistaken. Likewise, with moving walkways, it is difficult for a potential passenger to discern from a distance the direction of travel (horizontal) that a specific device is moving. Although moving walkways are more often associated in pairs moving in opposite directions, this is not always the case. It is not uncommon for moving walkways to be reversible in direction depending upon the major flow of traffic at a particular time during the day. Even where no moving walkway is traveling in the direction that a passenger wishes to go, it is desirable to have an indication of the direction of travel such that an unnecessary approach to the walkway can be avoided. Certainly where walkways are associated in pairs and one is traveling one way and the second the opposite way, it is most beneficial to view from a distance the direction of travel such that an approach to the appropriate walkway can be made.

The typical escalator or moving walkway has two basic moving components, the moving set of steps or foot platforms and a pair of moving handrails. The remaining operational components such as the motor and the track structures are stationary. A potential passenger approaching an escalator will attempt to discern its direction of travel by looking at one or both of the moving components. Unfortunately, the moving steps of a typical escalator are most commonly constructed of dark, unfinished metallic material with dark, often corrugated upper surfaces. Because the outward facing surfaces of the moving steps are either constantly in contact with passengers feet, or are constantly rubbing against each other in their progression around the escalator track, it is not practical to provide distinctive features thereon that might serve to indicate the direction of travel for the escalator when in motion. Such distinctive visible surfaces would quickly become indiscernible from the constant abrasive contact they endure.

The moving handrails of the typical escalator are seldom any better for allowing the distant viewer to discern the direction that the escalator is traveling. Typically these handrails are constructed of a durable, flexible, plastic or rubber compound of a single color, most often black or gray. It is next to impossible to discern from a distance the direction, up or down, that such a featureless surface is moving.

There have been a number of efforts in the past to address the discernment of the direction of an escalator or the like. These efforts have focused on providing single point lighted indicators positioned near the entrance and exit to the escalator. Examples of these include the following:

- U.S. Pat. No. 5,431,271 issued to Abraham et al. provides an electronic lighted indicator positioned near the exit or entrance to an escalator designed to indicate from a distance the direction of travel for the escalator. The Abraham et al. patent utilizes an LED array positioned adjacent to the handrail near the steps of the escalator that displays either an up arrow or a dash to indicate the appropriate travel direction.

U.S. Pat. No. 4,798,274 issued to Saito is one of a number of patents owned by Hitachi, Ltd. related to escalators that includes an illumination device attached to the outside surface of the handrail support in a position to be viewed by a pedestrian at some distance from the escalator. As the drawings in this patent indicate, arrow indicia on the lighted component indicate the direction of travel for the escalator.

Other U.S. Patents that focus more on the structure of the moving handrail include the following:

- U.S. Pat. No. 5,160,009 issued to Iyoda et al. describes the cross sectional structure of an escalator handrail and distinguishes a unique core member that is driven by the handrail driving device.
- U.S. Pat. No. 5,020,256 issued to French discloses an escalator handrail with internal illumination and a cover of transparent material for the insertion of advertising material therein.

U.S. Pat. No. 5,275,270 issued to Dobo describes an escalator handrail made up of distinct sections that are held together with a plurality of internal cables.

U.S. Pat. No. 6,047,809 issued to Idetsuki discloses another effort to position advertising material beneath a transparent cover over the handrail on an escalator.

Most of the above efforts fails to provide adequate information to the distant potential passenger about the direction of travel of that particular escalator or moving walkway. Those that do provide such information do so at the expense of complex lighted indicator systems that not only increase the cost of the escalator but are further subject to failure and maintenance concerns.

Overall the above referenced efforts fail to provide ease of use for the typical pedestrian or user of escalators and the like. Some of the directional indicators described are as difficult to see at a distance as is the movement of the escalator steps or the motion of the handrail. To be truly helpful, a directional indicator must provide ease of use for the typical person positioned at more than few hundred feet from the entrance (or exit) of the escalator or moving walkway.

It would therefore be desirable to have a mechanism for identifying the direction of travel for an escalator or a moving walkway, from a distance that is sufficient to decide whether to approach the walkway or escalator. It would be desirable if such a mechanism were easily discernable from more than a few hundred feet such that a potential passenger need not approach a walkway or escalator in order to determine whether it should be used or not. It would be desirable if such a mechanism included indicators or indicia that did not degrade with time or with constant abrasive contact. It would also be desirable if a system incorporating a mechanism for indicating the direction of travel would also incorporate a means for illuminating the indicia or indicator in a manner that allows it to be visible in low light environments.

SUMMARY OF THE INVENTION

It is therefore an object of the present invention to provide a directional indicator for an automated transport device that permits the discernment of the direction of travel for the device from a distance.

It is a further object of the present invention to provide a directional indicator for an escalator or a moving walkway that is "user friendly" in that it provides ease of use to the typical pedestrian deciding whether or not to approach from a distance.

It is a further object of the present invention to provide a directional indicator for an escalator or a moving walkway that is incorporated onto or into the moving handrail component of the escalator or moving walkway.

It is a further object of the present invention to provide indicia on the moving handrail component of an escalator or moving walkway that is visually contrasted to the primary component material of the handrail.

It is a further object of the present invention to provide an illumination device where necessary to highlight the visual contrast between the directional travel indicia and the primary component material of the moving handrail.

It is a further object of the present invention to provide an improved escalator or moving walkway system that incorporates visual indicia on the moving handrails thereof in a manner that permits discernment of the direction of travel of the escalator or moving walkway from a distance sufficient to permit a potential passenger to decide whether or not to approach the device.

In fulfillment of these and other objectives, the present invention provides a directional indicator for automated transport devices such as escalators and moving walkways, for permitting the discernment of the direction of travel of the transport device from a distance. The directional indicator comprises a set of indicia permanently formed in or placed on the moving handrail of the escalator or moving walkway, that can be seen and easily discerned from a distance. The indicia are preferably of a bright color that strongly contrasts with the dark gray or black of the typical escalator or moving walkway handrail construction. The indicia are also sized, configured, and spaced along the handrail to allow the viewer from a distance to quickly and easily interpret the motion thereof. The indicia are constructed of material that is placed on or incorporated into the material of the handrail in such a manner as to prevent its removal from the handrail and to prevent the degradation of the contrasting visual effect over time. The system further incorporates illumination devices that direct visible light or ultraviolet light onto the indicia in a manner that allows it to be visible in low light environments.

DETAILED DESCRIPTION OF THE PREFERRED EMBODIMENTS

Figure 1:
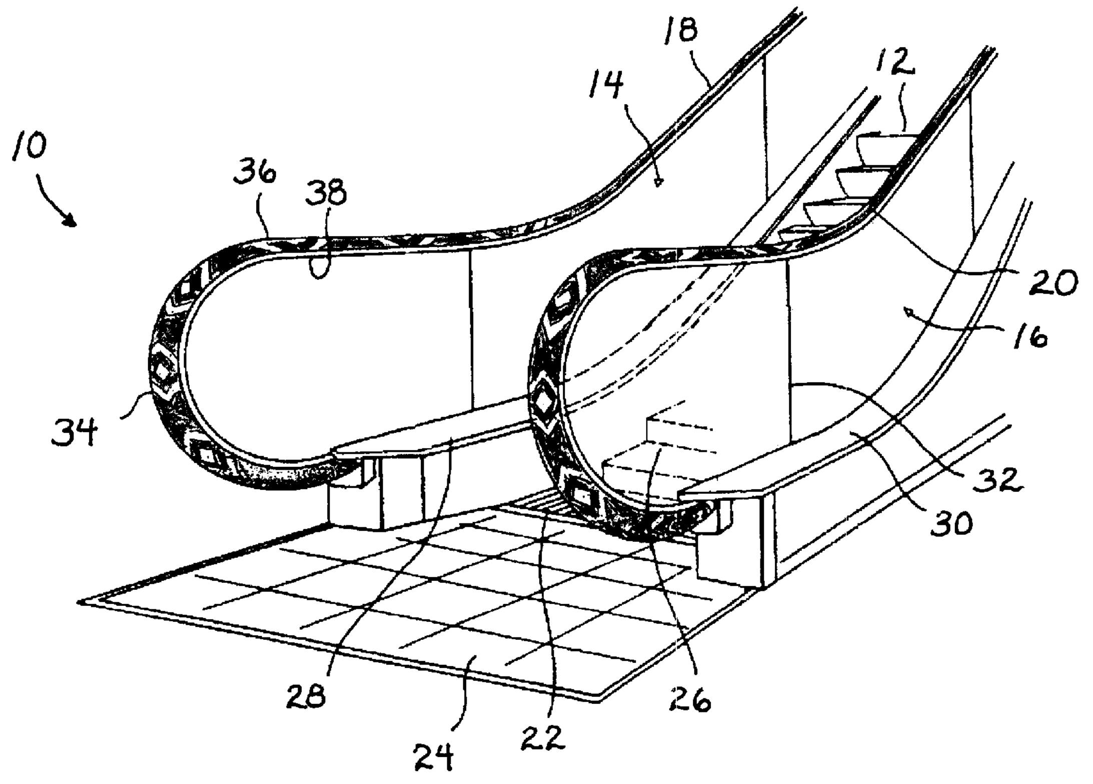
FIG. 1 is a perspective view of a typical escalator structure showing the present invention incorporated thereon.

Reference is made first to FIG. 1 wherein a typical escalator arrangement is shown. In this view, the lower end of an escalator that ascends (or descends) between two floors in a building is represented. In this view, escalator 10 is comprised primarily of moving steps 12 and sidewalls 14 and 16. Atop each sidewall 14 and 16 are positioned moving handrails 18 and 20.

An ingress (or egress) platform 22 is shown immediately adjacent to a lower step 26 of moving steps 12. Ingress (or egress) platform 22 is not in motion but is fixed to an entry/exit floor space 24. On either side of moving steps 12, and serving to support and position sidewalls 14 and 16, are base components 28 and 30. To some extent the operational mechanisms associated with escalator 10 are incorporated within the structures shown as base components 28 and 30. The mechanical features of escalator 10 shown are well known in the art and are not modified here by incorporation of the present invention.

Handrails 18 and 20 in the present invention are improved upon by incorporating the plurality of directional indicia 34 as shown. Moving handrails 18 and 20 each include a continuous loop of flexible handrail material with an outside exposed surface 36 and in inside surface (not shown) that moves along handrail track 38. In this manner the outside surface 36 is consistently exposed and directed in a manner that can be viewed by passengers and potential passengers.

Figure 2:
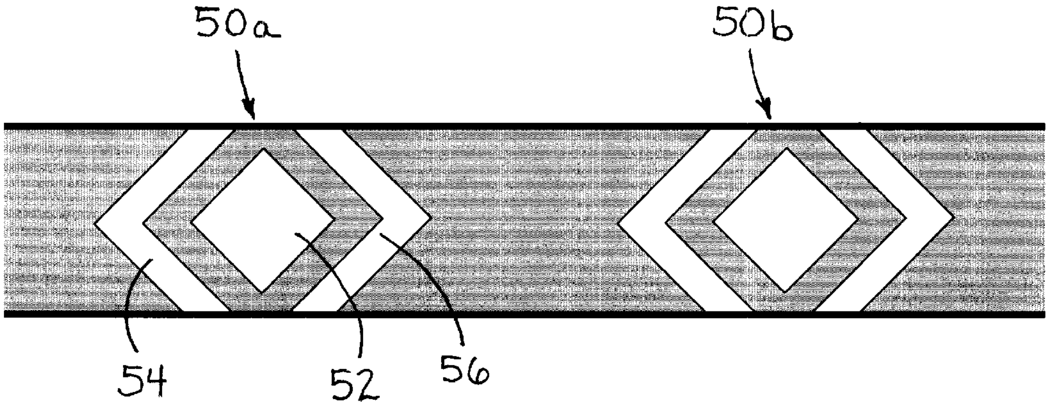
FIG. 2 is a top plan view of the handrail of an escalator or moving walkway incorporating the directional indicia thereon.

Reference is now made to FIG. 2 for a detailed description of the structure, geometry and function of the directional indicia of the present invention. As indicated above, the objective in defining the geometry and coloration of the directional indicia is to provide indicia that are not only discernable from a great distance but which also permit the discernment of motion from a great distance. In achieving the above objective, the geometric structures shown in FIG. 2, namely partially repetitive, high contrast areas, provide both identification of the indicator and its direction of motion.

Indicia 50*a* and 50*b* are each comprised of geometric elements that contribute to both the discernment of the indicator but also the discernment of the direction the indicator, and thus the handrail, is moving. Center diamond 52 provides a focal point for the indicia comprising a bold, relatively large area of contrast. Arrow elements 54 and 56 repeat part of the form of center diamond 52 in a manner that expands the overall area of contrast and high lights each of the two potential directions of travel.

It should be understood that the geometric shapes shown in FIG. 2 are examples only and do not represent the full choice of appropriate indicia. The shapes shown, however, do provide the basic elements necessary for the indicia utilized in conjunction with the present invention, namely a large area of contrast, repetitive spacing, and predisposed directional features. Many other geometric shapes meeting these basic requirements could be utilized.

Figure 3:
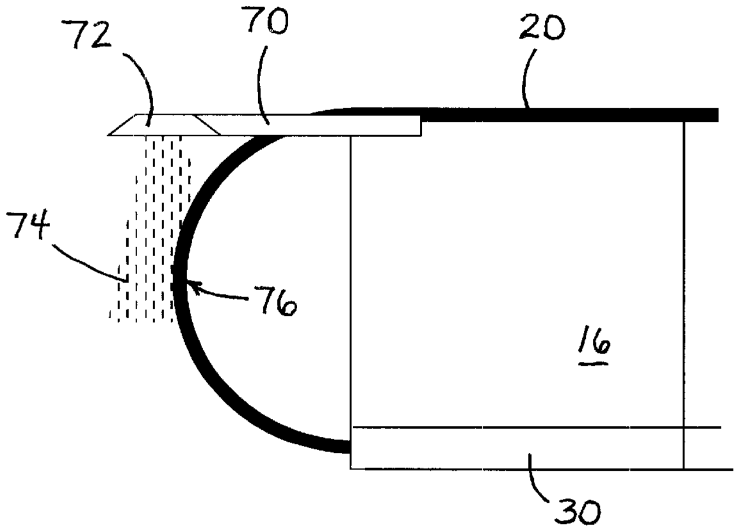
FIG. 3 is a schematic view of an arrangement including an illuminating device in association with the directional indicia of the present invention.

Reference is now made to FIG. 3 for a brief description of an alternative embodiment of the present invention wherein an illuminating device is placed in association with the directional indicia so as to assure their discernment in low light conditions. In FIG. 3, base component 30 is shown supporting sidewall 16 which in turn supports handrail 20. Extending from sidewall 16, and electrically connected to a power source there through, is light bracket 70. At the end of light bracket 70 is positioned light source 72 which is directed to shine light 74 down to be reflected off of the surface of a section 76 of moving handrail 20.

In a first preferred embodiment of the illuminating light source the directional indicia positioned on or in the handrail are designed to be reflective of visible light and preferably light having frequencies generally in the middle of the visible light spectrum. In a second embodiment, the illumination light source emits ultraviolet light and the indicia are comprised of fluorescent material that emits visible light when illuminated with ultraviolet light. In either case the objective is to provide sufficient illumination of the indicia such that they may be discerned as described herein from a significant distance.

Overall, the present invention serves to make the use of escalators and moving walkway much easier in that it allows discernment of the direction of travel from a much greater distance. In addition, the implementation of the present invention does not require significant effort to retrofit to existing escalator and moving walkway installation. Various means for placing the indicia described herein onto or into the moving handrail will be apparent to those skilled in the art. Adhesive films, paints, inks, and dyes may all be implemented without interfering with the normal mechanical movement of the handrail about the track.

Although the present invention has been described in conjunction with its implementation on escalators and moving walkways, it is anticipated that the basic concepts of the invention translate into structures and geometries appropriate for implementation in conjunction with a variety of transport mechanisms. It is anticipated that those skilled in the art will readily define modifications of the invention appropriate for its implementation in other industrial transport mechanism environments.

In addition, the specific indicia disclosed herein are representative only and those skilled in the art will recognize alternative shapes and patterns that meet the identified criteria herein and fall within the scope of the appended claims.

I claim:

1. A directional indicator for an automated transport device for permitting the discernment of the direction of travel for said transport device from a distance, said transport device having at least one moving handrail, the directional indicator comprising:

a plurality of visually contrasting elements positioned in repetitive, spaced relationship on said at least one moving handrail of said transport device.

2. The directional indicator of claim 1 further comprising an illumination device for directing light onto the visible surfaces of said plurality of visually contrasting elements to permit the discernment of said elements under low ambient light conditions.

3. The directional indicator of claim 2 wherein said illumination device comprises an ultraviolet light source and said visually contrasting elements each comprise a fluorescent material.

4. The directional indicator of claim 2 wherein said illumination device comprises a visible light source and said visually contrasting elements each comprise material reflective of light at frequencies in approximately the middle of the visible light spectrum.

5. The directional indicator of claim 1 wherein said visually contrasting elements each comprise a layer of material disposed on the surface of said at least one moving handrail.

6. The directional indicator of claim 1 wherein said visually contrasting elements each comprise an integrally molded volume of material disposed within the material substance of which said at least one moving handrail is constructed.

7. The directional indicator of claim 1 wherein said visually contrasting elements are geometrically configured to optimize the perception of movement from a distance.

8. An improved escalator for the transport of people up and down between vertically displaced levels of walking surfaces, said escalator having at least one moving handrail, the improvement comprising:

said at least one moving handrail bearing a plurality of indicia for distant discernment of the direction of travel of said moving handrail.

9. The improved escalator of claim 8 wherein at least one of said plurality of indicia comprises a focal point, visually contrasting, geometric shape having a width greater than half a width of said handrail.

10. The improved escalator of claim 9 wherein said plurality of indicia are repetitively positioned in generally equal spacing on the entire outer surface of said handrail.

11. The improved escalator of claim 8 wherein at least one of said plurality of indicia comprises a visually contrasting geometric shape having at least one apex directed along a longitudinal axis of said handrail thereby providing a predisposed indication of a direction of travel along said longitudinal axis.

12. The improved escalator of claim 8 wherein at least one of said plurality of indicia comprises contrasting bands generally transverse to a longitudinal axis of said handrail thereby providing a stroboscopic effect to the viewer of the indicia.

13. The improved escalator of claim 8 wherein at least one of said plurality of indicia comprises three concentric, contrasting, diamond shapes of increasing length along said longitudinal axis of said handrail.

14. An improved escalator for the transport of people up and down between vertically displaced levels of walking surfaces, said escalator having at least one moving handrail, the improvement comprising:

said at least one moving handrail bearing a plurality of indicia for distant discernment of the direction of travel of said moving handrail, said plurality of indicia repetitively positioned in generally equal spacing on the entire outer surface of said handrail;

at least one of said plurality of indicia comprising a focal point, visually contrasting, geometric shape having a width greater than half a width of said handrail;

at least one of said plurality of indicia comprises a visually contrasting geometric shape having at least one apex directed along a longitudinal axis of said handrail thereby providing a predisposed indication of a direction of travel along said longitudinal axis; and at least one of said plurality of indicia comprises contrasting bands generally transverse to said longitudinal axis of said handrail thereby providing a stroboscopic effect to the viewer of the indicia.

* * * * *